(12) United States Patent
McKethan, Jr.

(10) Patent No.: US 8,539,358 B2
(45) Date of Patent: Sep. 17, 2013

(54) TRACKING RESCHEDULED MEETINGS ON ELECTRONIC CALENDARS

(75) Inventor: Kenneth Alexander McKethan, Jr., Dunn, NC (US)

(73) Assignee: International Business Machines Corporation, Armonk, NY (US)

( * ) Notice: Subject to any disclaimer, the term of this patent is extended or adjusted under 35 U.S.C. 154(b) by 2237 days.

(21) Appl. No.: 10/864,234

(22) Filed: Jun. 9, 2004

(65) Prior Publication Data

US 2005/0278632 A1 Dec. 15, 2005

(51) Int. Cl.
*G06F 3/00* (2006.01)

(52) U.S. Cl.
USPC .......................... 715/751; 715/963; 715/847

(58) Field of Classification Search
USPC ................ 708/112; 283/3, 4; 715/710, 963, 715/751, 847; 705/8, 9
See application file for complete search history.

(56) References Cited

U.S. PATENT DOCUMENTS

| 4,489,958 | A | * | 12/1984 | Martin | 283/3 |
| 5,050,077 | A | | 9/1991 | Vincent | 364/401 |
| 6,016,478 | A | * | 1/2000 | Zhang et al. | 705/9 |
| 6,094,681 | A | | 7/2000 | Shaffer et al. | 709/224 |
| 6,611,275 | B1 | * | 8/2003 | Zey et al. | 715/752 |
| 2002/0140733 | A1 | | 10/2002 | Edlund et al. | 345/764 |
| 2002/0184321 | A1 | | 12/2002 | Fishman et al. | 709/206 |
| 2003/0149606 | A1 | | 8/2003 | Cragun et al. | 705/8 |

* cited by examiner

*Primary Examiner* — Andrey Belousov
(74) *Attorney, Agent, or Firm* — Steven M. Greenberg, Esq.; Carey, Rodrdiguez, Greenberg & O'Keefe

(57) ABSTRACT

Methods and computer program products for tracking rescheduled meetings on an electronic calendar. When a meeting is rescheduled from a first time to a second time, the visual appearance of the meeting notice for the first time is altered. A link that changes the calendar page to the page showing the second time is provided on the page corresponding to the first time, so that the user may move conveniently to the rescheduled meeting notice. The meeting notice at the second time may be provided with a link that changes the calendar page to the page showing the first time, so that the user may move conveniently to the meeting notice as originally scheduled.

14 Claims, 5 Drawing Sheets

FIG. 2
Prior Art

Tuesday, May 4, 2004 — 200

| Time | |
|---|---|
| 8 AM | |
| 30 | |
| 9 AM | 9:00 AM - 10:00 AM<br>Budget Meeting |
| 30 | |
| 10 AM | |
| 30 | |
| 11 Am | |
| 30 | |

| | Monday, May 17, 2004 | 500 |
|---|---|---|

| 8 AM | |
|---|---|
| 30 | |
| 9 AM | |
| 30 | |
| 10 AM | 10:00 AM - 11:00 AM<br>Budget Meeting |
| 30 | [OLD TIME] 510 |
| 11 Am | |
| 30 | |

505

TRACKING RESCHEDULED MEETINGS ON ELECTRONIC CALENDARS

BACKGROUND OF THE INVENTION

The invention relates to the field of electronic calendars.

Electronic calendars, which may be provided as functions of personal computers, laptop computers, desktop workstations, personal digital assistants, server applications, and the like, have become widely used as a convenient way of keeping track of appointments. With the agreement of the calendar's user, appointments may be scheduled directly from electronic invitations that arrive in the form of email to add meeting notices to the appropriate pages of the calendar.

As with any kind of appointment system, a meeting that has already been scheduled may sometimes need to be rescheduled. In the case of an electronic calendar, a particular kind of meeting invitation called here a "rescheduling invitation" may be sent out by the originator of the meeting. With the agreement of the calendar's user, a scheduled meeting may be automatically reschedule for another time or date based on the rescheduling invitation.

Some meetings may be standing meetings, for example a meeting to be held the first Tuesday of every month at 9:00 AM to discuss a budget. Suppose that the meeting to be held on Tuesday, 4 May 2004, is rescheduled for Monday, 17 May 2004, at 10:00 AM. A user of an electronic calendar who has become accustomed to the normally scheduled time of such a meeting may be at a loss when viewing the calendar page for Tuesday, 4 May 2004, as the regularly scheduled meeting, once rescheduled, no longer appears on the calendar where the user expects. This may cause the user to miss the meeting, or to endure the frustration of searching through the calendar to determine whether the meeting has been rescheduled, and if so, for when.

In general, as a user's calendar becomes full, reschedulings may be recorded properly by the calendar, but may not become embedded in the user's consciousness. Thus, there is a need for a convenient way to enable users of electronic calendars to keep track of rescheduled meetings.

SUMMARY OF THE INVENTION

The invention includes methods and computer program products for tracking rescheduled meetings on an electronic calendar. When a meeting is rescheduled from a first time to a second time, the visual appearance of the meeting notice for the first time is altered. A link that changes the calendar page to the page that corresponds to the second time is provided on the calendar page that corresponds to the first time, so that the user may move conveniently to the rescheduled meeting notice. The meeting notice at the second time may be provided with a link that changes the calendar page to the page that corresponds to the first time, so that the user may move conveniently to the meeting notice as originally scheduled.

BRIEF DESCRIPTION OF THE DRAWINGS

FIG. 2 shows an exemplary page of an electronic calendar according to the prior art.

FIG. 5 shows yet another exemplary page of an electronic calendar according to the invention.

DETAILED DESCRIPTION OF THE INVENTION

Figure 1:
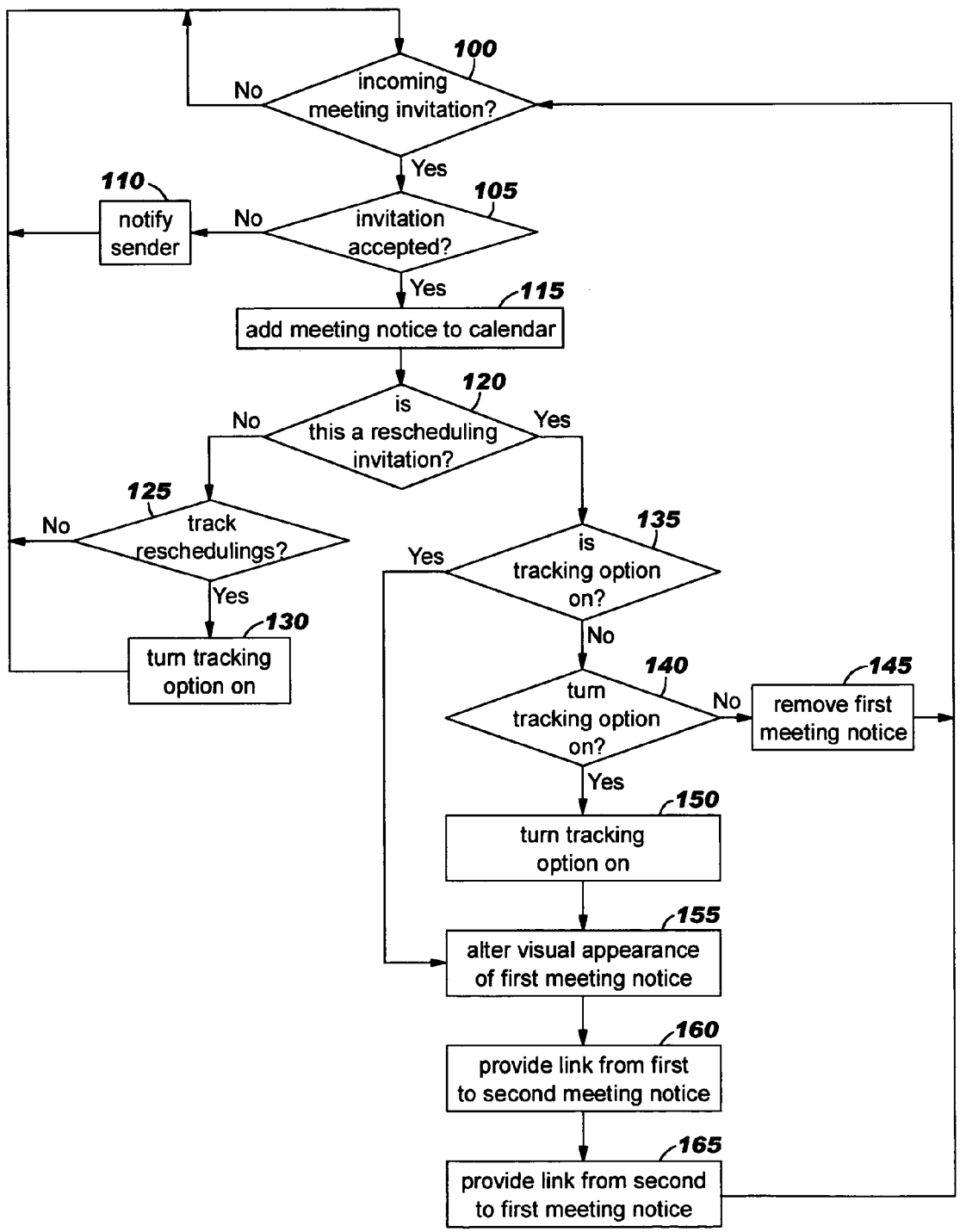
FIG. 1 shows a method for tracking rescheduled meetings on an electronic calendar.

The present invention will now be described more fully hereinafter, with reference to the accompanying drawings, in which illustrative embodiments of the invention are shown. Throughout the drawings, like numbers refer to like elements.

The invention may, however, be embodied in many different forms, and should not be construed as limited to the embodiments set forth herein; rather, these embodiments are provided so that the disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an embodiment entirely in hardware, entirely in software, or in a combination of aspects in hardware and software referred to as circuits and modules.

Furthermore, the present invention may take the form of a computer program product on a computer-usable storage medium having computer-usable program code tangibly embodied in the medium. Any suitable computer-readable medium may be utilized, including hard disks, CD-ROMs, optical storage devices, and magnetic storage devices.

Computer program code for carrying out operations of the present invention may be written in an object oriented programming language such as Java7, Smalltalk, or C++. However, the computer program code for carrying out operations of the present invention may also be written in conventional procedural programming languages, such as the C programming language. The program code may execute entirely on the user's computer, partly on the user's computer, as a stand-alone software package, partly on the user's computer and partly on a remote computer, or entirely on a remote computer. The remote computer may be connected to the user's computer through a local area network or a wide area network, or the connection may be made to an external computer, for example through the Internet using an Internet Service Provider.

The present invention is described below with reference to flowchart illustrations and/or block diagrams of methods, apparatus (systems), and computer program products according to embodiments of the invention. It will be understood that each block of the flowchart illustrations and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions and/or acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the functions or acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions and/or acts specified in the flowchart and/or block diagram block or blocks.

FIG. 1 shows a method for tracking rescheduled meetings on an electronic calendar. The electronic calendar awaits the arrival of a meeting invitation (step 100). When an invitation arrives, for example when a user opens an invitation sent by electronic mail, a determination is made as to whether the user chooses to accept the invitation (step 105). Thus, the invitation is accepted or not at the user's discretion. This determination may be made, for example, in response to prompting the user to accept or reject the invitation. If the user does not accept the invitation, the sender of the invitation is notified (step 110), and the process returns to step 100 to await another meeting invitation.

Otherwise (i.e., the user accepts the invitation), an appointment to attend the meeting is recorded by adding a meeting notice to the appropriate page of the user's calendar (step 115). A determination is made as to whether the meeting invitation is a rescheduling invitation (step 120). The determination may be made by examining the contents or nature of the meeting invitation, or may be responsive to an indicator carried explicitly in the rescheduling invitation. One purpose of a rescheduling invitation is to reschedule a meeting that already appears on the user's calendar as a first meeting notice at a first time, by providing a second meeting notice on the user's calendar at a second time. Here, a difference in time may refer to a difference in clock, a difference in day, or a difference in both. Thus, for example, 9:00 AM on 4 May 2004 and 10:00 AM on 4 May 2004 refer to different times, 9:00 AM on 4 May 2004 and 9:00 AM on 7 May 2004 refer to different times, and 9:00 AM on 4 May 2004 and 10:00 AM on 7 May 2004 refer to different times.

If the invitation is not a rescheduling invitation, a determination is made as to whether reschedulings of the meeting are to be tracked (step 125). This determination may be made, for example, in response to prompting the user to enter his or her choice, or in response to an indicator set by the originator of the meeting invitation and carried in the invitation, or in response to a deduction made by the calendar upon examining the invitation. In the latter case, the deduction may be based on observing regular occurrences of the meeting. For example, reschedulings of standing meetings may be tracked by default.

If reschedulings are not to be tracked, the process returns to step 100 to await another meeting invitation. If reschedulings are to be tracked, the tracking option is turned on (step 130), and the process returns to step 100 to await another meeting invitation. In a preferred embodiment, the tracking option is turned on by setting an internal flag or other such indicator kept by the calendar in association with the meeting notice.

If the outcome in step 120 is that the meeting invitation is a rescheduling invitation, a determination is made as to whether the tracking option is set on for the meeting to be rescheduled (step 135). This determination may be made by examining the aforementioned flag. If the tracking option is not on, a determination is made as to whether the user would like turn the tracking option on in order to track reschedulings of the meeting (step 140). This determination may be in response to prompting the user to enter his or her choice.

If the user does not want to turn the tracking option on in order to track reschedulings, the first meeting notice is removed from the calendar (step 145), and the process returns to step 100 to await another meeting invitation. Otherwise (i.e., the user wants to track reschedulings), the tracking option is turned on (step 150).

In connection with turning the tracking option on in step 150, or if the outcome in step 135 is that the tracking option is already on, the visual appearance of the first meeting notice is altered (step 155), to convey to the user that the meeting once scheduled at the first time has been rescheduled. This alteration enables the user to determine at a glance that a standing meeting, for example, has been rescheduled. The first meeting notice is not removed entirely from the calendar; rather, at least a vestigial or partial representation of the first meeting notice persists somewhere on the calendar page that corresponds to the first time. The visual appearance of the first meeting notice may be altered by, for example, graying the first meeting notice; labeling the first meeting notice to indicate that the meeting has been rescheduled; labeling the first meeting notice to indicate that the meeting has been rescheduled and displaying the second time; changing the position, of the first meeting notice or a vestigial representation thereof, on the calendar page toward the left or right of the page, or toward the top or bottom of the page, as will be discussed further below; altering a font characteristic such as color, style, or size; alternating the entry between off and on, or between different colors, or between different fonts, and so forth; in any number of ways that will be obvious to those skilled in the art, once they are taught the invention.

A forward link may be provided from the now-altered first meeting notice to the second meeting notice (step 160). By way of this link, the user may change the calendar from the page that shows the old meeting to the page that shows the new meeting taking its place. A backward link may be provided from the second meeting notice to the now-altered first meeting notice (step 165). By way of this link, the user may change the calendar from the page that shows the new meeting back to the page that shows the antecedent old meeting, which was rescheduled. The process then returns to step 100 to await another meeting notice.

FIGS. 2-5 further illustrate aspects of the invention in the context of the process just described with reference to FIG. 1.

FIG. 2 shows a hypothetical calendar page 200 for Tuesday, May 4, 2004. The page 200 includes a time slot 205, which shows a meeting notice for a meeting scheduled for 9:00 AM to discuss a budget. Thus, the calendar page 200 corresponds to the time 9:00 AM, Tuesday, 4 May 2004, which is the time of the meeting notice.

Figure 3:
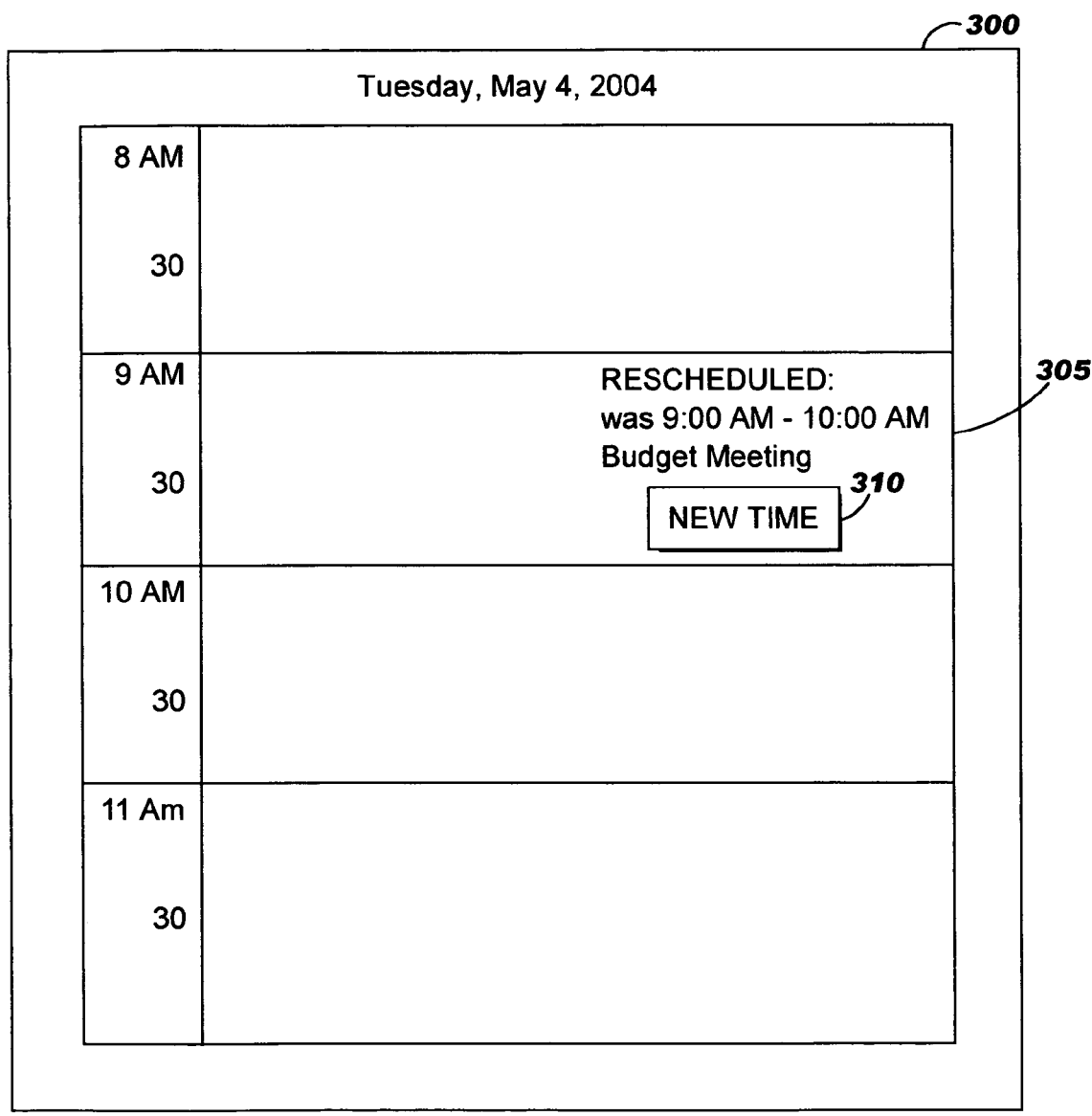
FIG. 3 shows an exemplary page of an electronic calendar according to the invention.
Figure 4:
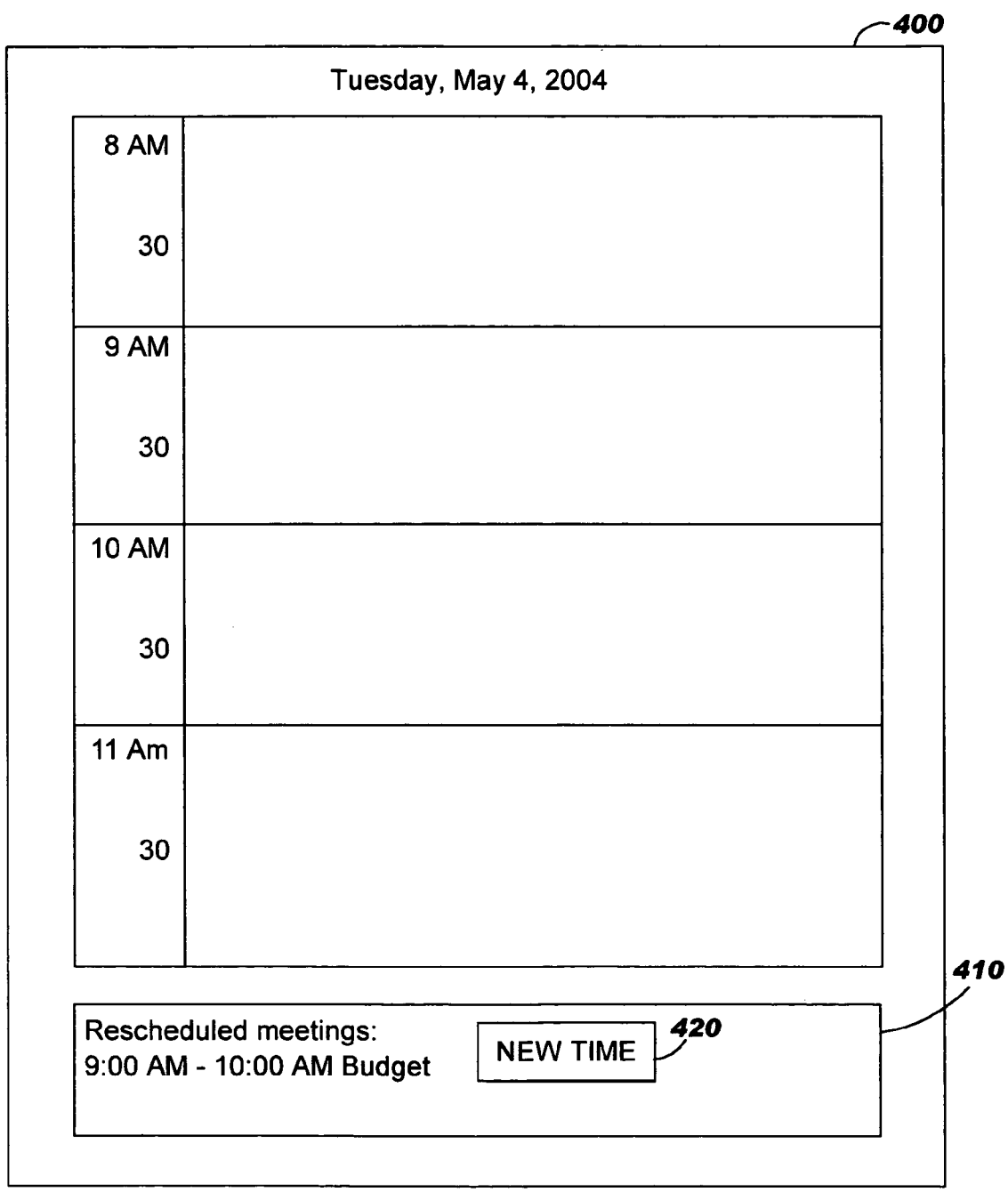
FIG. 4 shows another exemplary page of an electronic calendar according to the invention.

FIGS. 3 and 4 show exemplary embodiments of calendar pages for May 4, 2004, after a meeting has been rescheduled from Tuesday, May 4, 2004, at 9:00 AM, to Monday, May 17, 2004, at 10:00 AM. In FIG. 3, the visual appearance of the first meeting notice, which appears in time slot 305 of calendar page 300, has been altered by labeling the meeting notice in time slot 305 as "rescheduled," and moving the meeting notice to the right-hand side of the calendar page 300. A button 310 labeled "new time" is provided. The button 310 may be mouse-selected to engage a link that changes the calendar page 300 to a calendar page 500, which shows the second meeting notice, which is for Monday, May 17, 2004, the time for which the meeting has been rescheduled. Calendar page 500 is described below with reference to FIG. 5.

In FIG. 4, the visual appearance of the first meeting notice has been altered in a different way. In this example, a vestigial reminder of the first meeting notice now appears at the bottom of the calendar page 400 in a section 410 showing a list of meetings rescheduled from May 4 to other days. The vestigial reminder is positioned alongside a button 420 labeled "new time." The button 420 may be mouse-selected to engage a link that changes the calendar page 400 to the calendar page 500, which shows the second meeting notice, which is for Monday, May 17, 2004, the time for which the meeting has been rescheduled. The list in section 410 may have a plurality of entries and buttons, each corresponding to a meeting that has been rescheduled; only one entry and one button are shown in FIG. 4 in the interest of clarity.

FIG. 5 shows the calendar page 500 for Monday, May 17, 2004. The calendar page 500 includes a time slot 505, for 10:00 AM, which shows the second meeting notice for the meeting that was originally scheduled for 9:00 AM on Tuesday, May 4, but which has been rescheduled. A button 510 labeled "old time" is provided. The button 510 may be mouse-selected in order to change the calendar page 500 to calendar page 300, in order to show the altered first meeting notice, which is antecedent to the rescheduled meeting.

Although the foregoing has described methods and computer program products for tracking rescheduled meetings on an electronic calendar, the description is illustrative of the invention rather than limiting; the invention is limited only by the claims that follow.

I claim:

1. A method for tracking rescheduled meetings on electronic calendars, said method comprising:
    accepting, at a user's discretion, an electronic rescheduling invitation to reschedule a meeting on the user's electronic calendar from a first time of an original meeting to a second time of a rescheduled meeting;
    altering the visual appearance of a first meeting notice for the original meeting, on a page of the user's electronic calendar that corresponds to the first time of the original meeting; and
    providing a selectable link within the first meeting notice, wherein by selecting the selectable link the page of the calendar that contains the first meeting notice corresponding to the first time of the original meeting changes to a page of the calendar that contains a second meeting notice corresponding to the second time of the rescheduled meeting.

2. The method of claim 1, wherein altering the visual appearance of the meeting notice includes graying the meeting notice.

3. The method of claim 1, wherein altering the visual appearance of the meeting notice includes labeling the meeting notice to indicate that the meeting has been rescheduled.

4. The method of claim 1, wherein altering the visual appearance of the meeting notice includes labeling the meeting notice to indicate that the meeting has been rescheduled, and displaying the second time on the calendar page that corresponds to the first time.

5. The method of claim 1, wherein altering the visual appearance of the meeting notice includes changing the position, of the meeting notice, on the page of the calendar that corresponds to the first time.

6. The method of claim 1, wherein altering the visual appearance of the meeting notice includes altering a font used to display the meeting notice.

7. The method of claim 1, further comprising including a selectable link within the second meeting notice, wherein by selecting the selectable link within the second meeting notice page of the calendar that corresponds to the second time changes to the page of the calendar that corresponds to the first time.

8. A computer program product for tracking rescheduled meetings on electronic calendars, the computer program product comprising a computer readable medium having computer readable program code embedded therein, the computer readable program code comprising:
    computer readable program code configured to accept, at a user's discretion, an electronic rescheduling invitation to reschedule a meeting on the user's electronic calendar from a first time of an original meeting to a second time of a rescheduled meeting;
    computer readable program code configured to alter the visual appearance of a first meeting notice for the original meeting, on a page of the user's electronic calendar that corresponds to the first time of the original meeting; and
    computer readable program code configured to provide a selectable link within the first meeting notice, wherein by selecting the selectable link the page of the calendar that contains the first meeting notice corresponding to the first time of the original meeting changes to a page of the calendar that contains a second meeting notice corresponding to the second time of the rescheduled meeting.

9. The computer program product of claim 8, wherein the computer readable program code further comprises computer readable program code configured to alter the visual appearance of the meeting notice by graying the meeting notice.

10. The computer program product of claim 8, wherein the computer readable program code further comprises computer readable program code configured to alter the visual appearance of the meeting notice by labeling the meeting notice to indicate that the meeting has been rescheduled.

11. The computer program product of claim 8, wherein the computer readable program code further comprises computer readable program code configured to alter the visual appearance of the meeting notice by labeling the meeting notice to indicate that the meeting has been rescheduled, and displaying the second time on the calendar page that corresponds to the first time.

12. The computer program product of claim 8, wherein the computer readable program code further comprises computer readable program code configured to alter the visual appearance of the meeting notice by changing the position of the meeting notice on the page of the calendar that corresponds to the first time.

13. The computer program product of claim 8, wherein the computer readable program code further comprises computer readable program code configured to alter the visual appearance of the meeting notice by altering a font used to display the meeting notice.

14. The computer program product of claim 8, wherein the computer readable program code further comprises computer readable program code configured to provide a selectable link within the second meeting notice, wherein by selecting the selectable link within the second meeting notice page of the calendar that corresponds to the second time changes to the page of the calendar that corresponds to the first time.

* * * * *